United States Patent [19]

Christe

[11] Patent Number: 4,711,680

[45] Date of Patent: Dec. 8, 1987

[54] PURE FLUORINE GAS GENERATOR

[75] Inventor: Karl O. Christe, Calabasas, Calif.

[73] Assignee: Rockwell International Corporation, El Segundo, Calif.

[21] Appl. No.: 497,287

[22] Filed: May 23, 1983

[51] Int. Cl.$^4$ .......................... D03D 23/00; C01B 7/20
[52] U.S. Cl. .................................. 149/109.4; 149/119; 423/464; 423/500; 423/504
[58] Field of Search ............................ 149/109.4, 119; 423/464, 500, 504

[56] References Cited

U.S. PATENT DOCUMENTS

| | | | |
|---|---|---|---|
| 2,996,353 | 8/1961 | Deyrup | 423/464 |
| 3,337,295 | 8/1967 | White et al. | 423/464 |
| 3,709,748 | 1/1973 | Roberto | 149/119 |
| 3,843,546 | 10/1974 | Sobolev et al. | 423/464 |
| 3,963,542 | 6/1976 | Pilipovich | 149/193 |
| 3,980,509 | 9/1976 | Lubowitz et al. | 149/119 |
| 3,989,808 | 11/1976 | Asprey | 423/504 |
| 4,001,136 | 1/1977 | Channell et al. | 149/119 |
| 4,108,965 | 4/1978 | Christe | 149/119 |
| 4,172,884 | 10/1979 | Christe et al. | 423/351 |
| 4,284,617 | 8/1981 | Bowen et al. | 423/504 |
| 4,292,287 | 9/1981 | Orlett et al. | 423/500 |
| 4,374,112 | 2/1983 | Christe et al. | 149/119 |
| 4,379,128 | 4/1983 | Hähn et al. | 423/464 |
| 4,410,377 | 10/1983 | Christe et al. | 149/119 |
| 4,421,727 | 12/1983 | Wilson et al. | 149/119 |
| 4,446,920 | 5/1984 | Woytek et al. | 149/119 |
| 4,543,242 | 9/1985 | Aramaki et al. | 423/406 |

Primary Examiner—Edward A. Miller
Attorney, Agent, or Firm—H. Fredrick Hamann; Harry B. Field; David C. Faulkner

[57] ABSTRACT

A solid grain pure fluorine gas generator which comprises the in-situ generation of a thermodynamically unstable transition metal fluoride from its stable anion by a displacement reaction with a stronger Lewis acid, followed by the spontaneous irreversible decomposition of said unstable transition metal fluoride to a stable lower fluoride and elemental fluorine of superatmospheric pressure.

21 Claims, No Drawings

PURE FLUORINE GAS GENERATOR

BACKGROUND OF THE INVENTION

1. Field of the Invention

This invention relates to high-power pulsed chemical HF or DF lasers (PCL) and, more specifically, to solid grain pure fluorine gas geneators therefor.

2. Description of the Prior Art

In a PCL, molecular fluorine is dissociated by an energy source, such as flash photolysis or an electron beam, into atomic fluorine $$F_2 \xrightarrow{\Delta E} 2\dot{F}$$

which then reacts with either $H_2$ or $D_2$ to produce the lasing species vibrationally excited $HF^*$ or $DF^*$.

$$\dot{F} + D_2 \longrightarrow DF^* + \dot{D}$$

Since elemental fluorine has a low boiling point of $-188°$ C., it is usually stored either as a liquid at cryogenic temperatures or as a gas under high pressure. Both storage modes present great safety hazards and logistics problems, and therefore are unacceptable for military and space applications. In view of these problems solid grain fluorine gas generators are highly desirable. Such systems are composed of storable solids which are capable of generating gaseous fluorine on demand. Depending on the nature of the chemical laser, additional constraints are imposed on these generators. For example, a PCL is best operated in a gas recirculation mode at atmospheric pressure using He as a diluent and a fourfold excess of fluorine with respect to $H_2$ or $D_2$. Such a PCL requires a pure fluorine gas generator because any gaseous by-products would build up in the recirculating gas with an increase in the number of cycles, and because other fluorine sources, such as $NF_3$, are not efficiently dissociated by flashlamps, and their reaction rates with $D_2$ are too slow.

All the solid grain fluorine gas generators developed up to this point are for continuous wave single pass HF-DF lasers and are based on the thermal decomposition of $NF_4^+$ salts, as described in U.S. Pat. Nos. 3,963,542 and 4,172,884. These generators produce about equimolar amounts of $F_2$ and $NF_3$, and therefore cannot be used in a PCL, particularly when operated in a gas recirculation mode. Several systems capable of generating pure fluorine have previously been reported, but have either been refuted or exhibit serious drawbacks, as shown by the following examples: (i) The report by Brauner (J. Chem. Soc., 65 (1894) 393) that pyrolysis of $K_3PbF_7$ yields $F_2$ was refuted by Ruff (Z.anorg. allgem.Chem., 98 (1916) 27,38); and (ii) the thermal decompositions of $CoF_3$ (NSWC Report WOL TR 77-23) and $K_2NiF_6.KF$ (J. Fluorine Chem., 7 (1976) 359) require impractically high temperatures and are based on equilibrium reactions which at lower temperatures result in a reformation of the starting materials under fluorine uptake. Consequently, none of these systems are useful for PCL applications which require a solid grain gas generator fulfilling the following conditions: (1) generation of pure fluorine to avoid buildup of gases which deactivated the laser; (2) generation of $F_2$ at high pressure to minimize the size of the gas accumulator and to permit feeding of an atmospheric pressure laser; (3) generation of $F_2$ at moderate temperatures to avoid metal fires in the generator and fluorine losses to the hardware, to minimize the energy requirements for the generator, and to obtain a fast generator response time; and (4) the $F_2$ generating reaction must be irreversible to eliminate the need for either continuous heating of the generator or complex hardware allowing rapid removal of the $F_2$ while the generator is hot.

SUMMARY OF THE INVENTION

Accordingly, there is provided by the present invention a system which overcomes all the drawbacks of the prior art while meeting all of the above requirements for a solid grain pure fluorine gas generator for a PCL. This system is based on the fact that certain high oxidation state transition metal fluorides are thermodynamically unstable and decompose even at room temperature by an irreversible reaction to a lower fluoride and elemental fluorine, as shown by the following generalized equation where M stands for a typical transition metal and the oxidation state of M is assumed to be +IV $$MF_4 \rightarrow MF_2 + F_2$$

Although free $MF_4$ is usually not known and does not exist as a stable molecule, the +IV oxidation state of M can be stabilized by anion formation, i.e. in the form of $MF_6^{2-}$. Thus, a stable $A_2MF_6$ salt, where A is a typical alkali metal such as potassium or an alkaline earth metal, can be prepared by a high temperature fluorination of a stoichiometric mixture of AF and $MF_2$ according to:

$$2AF + MF_2 + F_2 \xrightarrow{T} A_2MF_6$$

If the $A_2MF_6$ prepared in this manner is then subjected to a displacement reaction with a Lewis acid Y which is stronger than $MF_4$, the following displacement reaction can be carried out which results in the in-situ formation of $MF_4$:

$$A_2MF_6 + 2Y \rightarrow 2AYF + [MF_4]$$

Since free $MF_4$ is thermodynamically unstable, it spontaneously decomposes to $MF_2$ and $F_2$ in an irreversible reaction which permits the generation of high pressure fluorine without the possibility of a back reaction:

$$[MF_4] \rightarrow MF_2 + F_2$$

Since it was found that $A_2MF_6$ can be premixed with Y and forms stable mixtures until the melting point or onset of sublimation of Y is approached, the temperature of the above displacement reaction can be controlled by a judicious choice of Y.

OBJECTS OF THE INVENTION

Therefore, it is an ojbect of the invention to provide a solid grain fluorine gas generator producing pure fluorine.

Another object is to provide a fluorine generator which is based on an irreversible reaction and therefore can provide $F_2$ of superatomspheric pressure.

A further object of the invention is a generator producing superatmospheric $F_2$ at moderate temperatures thereby avoiding material compatibility problems, minimizing energy requirements, and providing rapid and controllable fluorine evolution.

Other objects, advantages and novel features of the present invention will become apparent from the following detailed description.

DESCRIPTION OF THE PREFERRED EMBODIMENT

According to the present invention, pure fluorine gas at superatompsheric pressure can be generated at moderate temperatures from a solid grain comprising a mixture of a stable salt of a high oxidation state transition metal fluoride anion with a strong Lewis acid. The selected transition metal must possess the ability to form stable complex fluoro anions in oxidation states which are unstable for the free transition metal fluoride parent molecule. When through a displacement reaction the anion is converted to the free parent molecule, the high oxidation state of the anion is destabilized and the unstable free parent molecule undergoes spontaneous decomposition to a lower oxidation state fluoride and elemental fluorine. Since the amount of fluorine evolution depends, in part, on the difference between the highest stable oxidation state of the complex fluoro anion and that of the free parent molecule, the transition metal is chosen in such a way to maximize this difference. Furthermore, the transition metal should be as light as possible for a maximum fluorine yield, and should also be rather inexpensive. Consequently, the preferred transition metals of this invention are those of the first transition metal period of the periodic system, particularly Mn, Fe, Co, Ni, and Cu. Thus, Ni and Cu are known to form stable complex fluoro anions in the +IV oxidation state, i.e. $NiF_6^{2-}$ and $CuF_6^{2-}$, whereas the highest stable oxidation state parent molecules are $NiF_2$ and $CuF_2$, respectively. The overall reaction can then be described by the following equation

$$A_2MF_6 + 2Y \rightarrow 2AYF + MF_2 + F_2$$

where M stands for the transition metal. Obviously, this invention is not limited to hexafluoro anions. For example, tetrafluoro anions such as $CuF_4^-$ or $AgF_4^-$ are well known and can undergo the following analogous reaction:

$$AMF_4 + Y \rightarrow AYF + MF_2 + 0.5F_2$$

For A any cation capable of forming stable $MF_6^{2-}$ or $MF_4^-$ salts can be used. Typical examples are alkali metals ($Li^+$ to $Cs^+$) and alkaline earth metal cations ($Mg^{2+}$ to $Ba^{2+}$). From overall $F_2$ yield considerations, multiple charged light cations are preferred.

The following selection criteria apply to the Lewis acid Y. It should be a stable nonvolatile solid at room temperature and be compatible with the transition metal fluoride salt. It also must be a stronger Lewis acid than the transition metal fluoride which is to be displaced from its salt, and it should melt or sublime at a moderately higher temperature, in the range of about 50° to about 300° C., to minimize the energy required to effect the displacement reaction. Again, a low molecular weight and an ability to form multiple charged anions are desirable for Y to achieve a maximum $F_2$ yield. Typical examples for suitable Lewis acids are $BiF_5$, $NbF_5$, or $TiF_4$. However, combinations of several Lewis acids might also be used to tailor their melting point to the desired range by taking advantage of eutectics. Similarly, polyanion salts, such as alkali metal polybifluorides, could be used to convert Lewis acids which in their free state are volatile at ambient temperature, into stable and usable solids.

The general nature of the invention having been set forth, the following examples are presented as specific illustrations thereof. It will be understood that the invention is not limited to these examples, but is susceptible to various modifications that will be recognized by one of ordinary skill in the art.

All reactions were carried out in a well passivated (with 2 atm of $F_2$ at 200° C.) stainless steel apparatus comprising of a 30 ml Hoke cylinder equipped with a cross fitting and a feed-through for a thermocouple well which almost touched the bottom of the cylinder. A pressure transducer (Validyne DP-15) and a Hoke valve leading to a stainless steel vacuum line were connected to the two remaining sides of the cross. Weighed amounts of the transition metal fluoride salt and the Lewis acid were thoroughly mixed in the dry nitrogen atmosphere of a glove box and loaded into the apparatus. The apparatus was then connected to the vacuum line, evacuated, and leak checked. The bottom of the cylinder was rapidly heated by the hot air stream from a heat gun, and the pressure evolution and inside temperature of the reactor were followed on a strip chart recorder. The evolved fluorine was measured by standard PVT methods and analysed for its purity by reacting it with mercury. The material balance was further crosschecked by weighing the reactor before the reaction and after removal of the evolved fluorine.

EXAMPLE 1

A mixture of $K_2NiF_6$ (0.369 g) and $BiF_5$ (1.372 g) was rapidly heated, as described above. When the inside temperature reached about 60° C., rapid fluorine evolution started, resulting in a maximum pressure of 990 torr at a reactor temperature of 170° C. The purity of the evolved fluorine (1.1 mmol) was shown by mercury analysis to be in excess of 99%.

EXAMPLE 2

A mixture of $Cs_2CuF_6$ (0.89 g) and $BiF_5$ (1.20 g) was rapidly heated, as described in Example 1. Again, pure fluorine (0.9 mmol) was evolved, resulting in a maximum pressure of 836 torr.

EXAMPLE 3

A mixture of $Cs_2MnF_6$ (2.115 g) and $BiF_5$ (4.515 g) was rapidly heated, as described in Example 1. Again, pure fluorine (1.0 mmol) was evolved, resulting in a maximum pressure of 929 torr.

EXAMPLE 4

A mixture of $K_2NiF_6$ (1.584 g) and $TiF_4$ (0.774 g) was rapidly heated, as described in Example 1. Again, pure fluorine (0.87 mmol) was evolved in the temperature range 65° to 170° C., resulting in a maximum pressure of 810 torr.

EXAMPLE 5

A mixture of $K_2NiF_6$ (0.486 g), $TiF_4$ (0.240 g) and $BiF_5$ (0.590 g) was rapidly heated, as described in Example 1. Again, pure fluorine (0.88 mmol) was evolved in the temperature range 60° to 180° C., resulting in a maximum pressure of 820 torr.

Obviously, numerous modifications and variations of the present invention are possible in light of the above teaching. It is therefore to be understood that within the scope of the appended claims the invention may be practiced otherwise than as described herein.

What is claimed and desired to be secured by Letters Patent of the United States is:

1. A solid grain pure fluorine gas generator, comprising:
    a stable salt containing an anion derived from a thermodynamically unstable high-oxidation state transition metal fluoride; and
    at least one Lewis acid which is stronger than said transition metal fluoride and stably solid at ambient temperatures, but which melts or sublimes at temperatures moderately above ambient.

2. The gas generator of claim 1 where the cation of said stable salt containing an anion derived from a thermodynamically unstable high-oxidation state transition metal fluoride is selected from the group consisting of alkali metals and alkaline earth metals.

3. The gas generator of claim 2 wherein said cation is an alkali metal.

4. The gas generator of claim 3 wherein said alkali metal is selected from the group consisting of potassium and cesium.

5. The gas generator of claim 2 wherein said cation is an alkaline earth metal.

6. The gas generator of claim 1 wherein the transition metal of said transition metal fluorine is selected from the group of manganese, iron, cobalt, nickel, and copper.

7. The gas generator of claim 6 wherein said transition metal is manganese.

8. The gas generator of claim 6 wherein said transition metal is copper.

9. The gas generator of claim 6 wherein said transition metal is nickel.

10. The gas generator of claim 1 wherein said anion is a doubly charged hexafluoride anion.

11. The gas generator of claim 10 wherein said anion is $NiF_6^{2-}$.

12. The gas generator of claim 10 wherein said anion is $CuF_6^{2-}$.

13. The gas generator of claim 10 wherein said anion is $MnF_6^{2-}$.

14. The gas generator of claim 1 wherein said anion is a tetrafluoro anion.

15. The gas generator of claim 14 wherein said tetrafluoro anion is $CuF_4^{-}$.

16. The gas generator of claim 14 wherein said tetrafluoro anion is $AgF_4^{-}$.

17. The gas generator of claim 1 wherein said Lewis acid is $BiF_5$.

18. The gas generator of claim 1 wherein said Lewis acid is $TiF_4$.

19. The gas generator of claim 1 wherein said Lewis acid is $NbF_5$.

20. The gas generator of claim 1 wherein said Lewis acid is a mixture of $BiF_5$ and $TiF_4$.

21. A method of generating pure fluorine, comprising the steps of:
    mixing a stable salt containing an anion derived from a thermodynamically unstable high-oxidation state transition metal fluoride with a Lewis acid, wherein said Lewis acid is stronger than said transition metal fluoride and melts or sublimes at temperatures moderately above ambient;
    causing the temperature of said mixture to reach the melting or sublimation temperature of said Lewis acid;
    reacting said melting or subliming Lewis acid with said stable salt containing an anion derived from a thermodynamically unstable high-oxidation state transition metal fluoride to generate a thermodynamically unstable high-oxidation state transition metal fluoride which decomposes into a lower oxidation state fluoride and pure fluorine.

* * * * *